United States Patent
Kamel et al.

(10) Patent No.: US 10,693,873 B2
(45) Date of Patent: Jun. 23, 2020

(54) SECURING REMOTE AUTHENTICATION

(71) Applicant: Microsoft Technology Licensing, LLC, Redmond, WA (US)

(72) Inventors: Tarek B. Kamel, Issaquah, WA (US); Adrian Frei, Seattle, WA (US); James Shang Kai Chou, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/041,283

(22) Filed: Jul. 20, 2018

(65) Prior Publication Data

US 2019/0182245 A1 Jun. 13, 2019

Related U.S. Application Data

(63) Continuation of application No. 15/083,935, filed on Mar. 29, 2016, now Pat. No. 10,050,963.

(51) Int. Cl.
| | |
|---|---|
| *H04L 29/06* | (2006.01) |
| *G06F 21/35* | (2013.01) |
| *H04W 12/06* | (2009.01) |
| *H04L 29/08* | (2006.01) |
| *H04W 12/00* | (2009.01) |

(52) U.S. Cl.
CPC ........ *H04L 63/0876* (2013.01); *G06F 21/35* (2013.01); *H04L 63/0492* (2013.01); *H04L 63/0853* (2013.01); *H04L 67/14* (2013.01); *H04W 12/06* (2013.01); *H04W 12/00503* (2019.01); *H04W 12/00522* (2019.01)

(58) Field of Classification Search
None
See application file for complete search history.

(56) References Cited

U.S. PATENT DOCUMENTS

| | | | |
|---|---|---|---|
| 8,662,384 B2 | 3/2014 | Dodin | |
| 9,754,097 B2 | 9/2017 | Hessler | |
| 2003/0012382 A1* | 1/2003 | Ferchichi | H04W 12/0802 380/270 |
| 2003/0120526 A1* | 6/2003 | Altman | G06Q 10/02 705/5 |
| 2005/0027570 A1* | 2/2005 | Maier | G06F 19/321 705/3 |
| 2013/0104198 A1* | 4/2013 | Grim | H04W 12/003 726/4 |
| 2015/0326565 A1* | 11/2015 | Kuang | G06F 16/9554 726/4 |

FOREIGN PATENT DOCUMENTS

EP 2648126 A1 * 10/2013 ............. H04L 63/18

* cited by examiner

*Primary Examiner* — William J. Goodchild
(74) *Attorney, Agent, or Firm* — Workman Nydegger

(57) ABSTRACT

Authenticating a secure session between a first user entity and an identity provider using a second user entity. The method includes receiving a request for a session from an entity that purports to be the first user entity. The method further includes sending authentication context from the request, and wherein the authentication context for the request arrives at the second user entity. The method further includes receiving an indication that the authentication context has been verified. As a result, the method further includes authenticating a secure session between a first user entity and an identity provider or approving a secure transaction.

20 Claims, 10 Drawing Sheets

SECURING REMOTE AUTHENTICATION

CROSS-REFERENCE TO RELATED APPLICATIONS

This application is a continuation of U.S. patent application Ser. No. 15/083,935 filed on Mar. 29, 2016, entitled "Securing Remote Authentication," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. The connections allow a computing system to access services at other computing systems and to quickly and efficiently receive application data from other computing systems.

In some examples, a device can log into a server or other identity provider to obtain services at the server. This can be done, for example, using remote sign-in. Remote sign-in includes signing into a primary entity (e.g., an app, a device, etc.) using a secondary previously provisioned entity (e.g., a smartcard, phone, an app, a browser, a device, etc.). However, such remote sign-in scenarios may be subject to phishing attacks on a one-time token/approval of the secondary previously provisioned entity. In these cases, a user intending to authenticate remotely can be tricked into authenticating an attacker's authentication request by authenticating an attacker's request with the user's secondary entity.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for authenticating a secure session between a first user entity and an identity provider using a second user entity. The method receiving a request for a session from an entity that purports to be the first user entity. The method further includes sending authentication context from the request, and wherein the authentication context for the request arrives at the second user entity. The method further includes receiving an indication that the authentication context has been verified. As a result, the method further includes authenticating a secure session between a first user entity and an identity provider or approving a secure transaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein can thwart a man-in-the-middle attack in a remote sign-in scenario by an identity provider (e.g., at a server) providing a user (or a user's device) with authentication context. For example, in one embodiment, an existing channel between an identity provider and a secondary entity can be used to provide authentication context, with respect to an authentication request to the server from a primary entity. In doing so, the identity provider could show possible discrepancies between the primary entity and the identity provider to the user in an effort to help prevent phishing in remote authentication requests. The user in these cases could be shown observations the login identity provider sees, such as the primary entity's location, the type of device of the primary entity, the type of authentication scenario, etc. The secondary entity, in this case, is used as a means of communication to the user should the primary entity be compromised. In these cases, the channel with the secondary entity would allow the identity provider to communicate to the user a message that cannot be modified by an attacker that has compromised the primary entity. In particular, the identity provider may be able to detect a modification by comparing authentication context from the primary entity and authentication context approved at the secondary entity.

Figure 1:
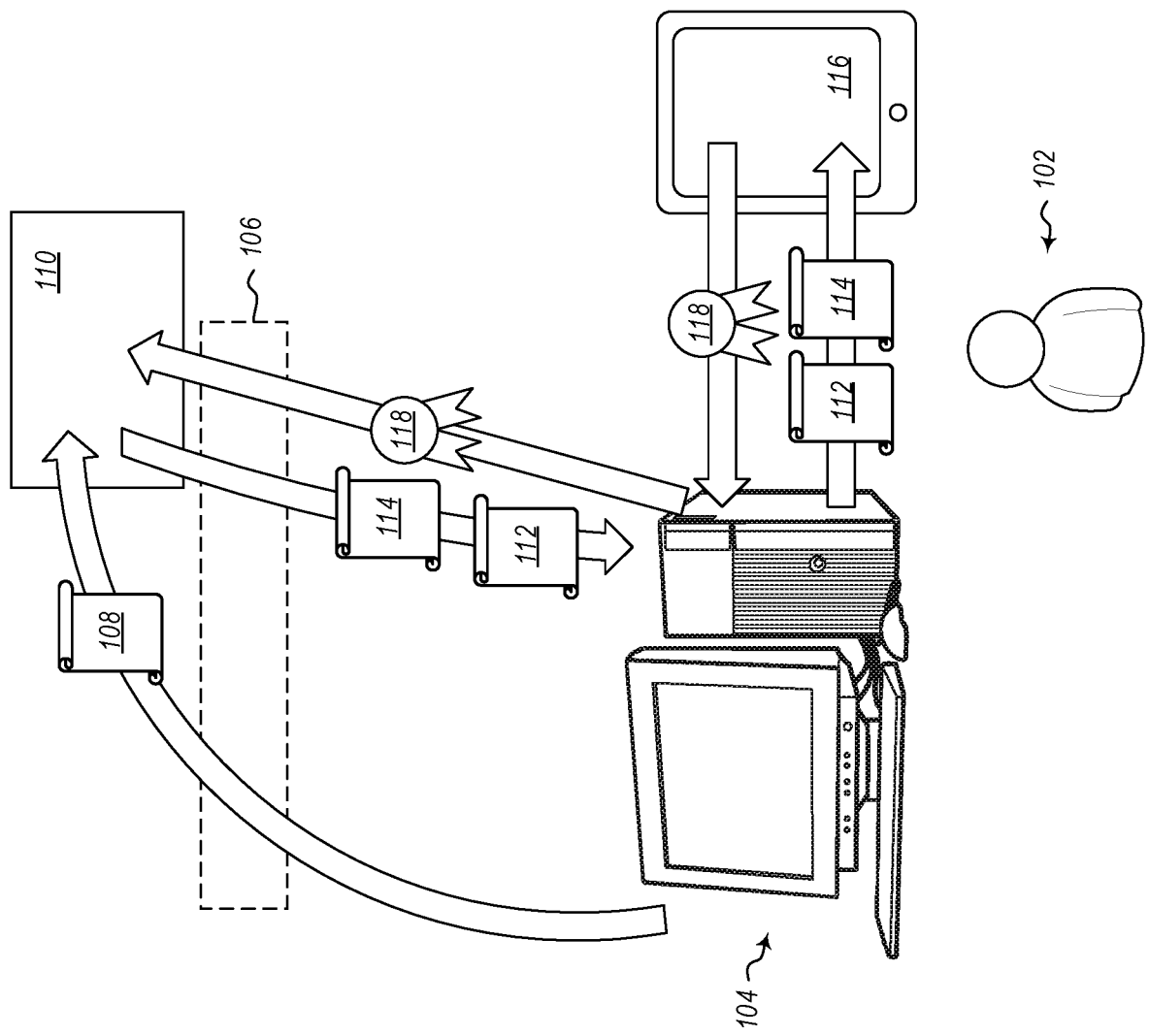
FIG. 1 illustrates an example environment where a primary entity can establish a secure connection with an identity provider using a secondary entity.

With reference now to FIG. 1, an example is illustrated. In FIG. 1, a user 102 initiates a device-to-device sign-in flow on a primary entity 104 (e.g., a device such as a computer, phone, etc., or an application) where there could potentially be a man-in-the-middle attacker 106. An authentication stack on the primary entity 104 makes a request 108 to an identity provider 110 (e.g., a service at a server) to initialize a login. The authentication stack at the primary entity 104 receives a nonce 112 and authentication context 114 (which may be, for example, a location) both of which are passed to a secondary entity 116 (e.g., a device, such as smart phone) for the secondary entity 116 to sign. On the secondary entity 116, the user is presented with the authentication context 114 (e.g., the location is displayed on the secondary entity 116 to the user), sees that the authentication context 114 is valid, and unlocks a local credential with a local gesture on the secondary entity 116. For example, the user 102 could select a button in a user interface of the secondary entity 116 indicating that a location displayed is indeed the physical location of the primary entity 104. The secondary entity 116 signs the nonce 112 and authentication context 114, sends the resulting token 118 to the primary entity 104 for the primary entity to use as a credential to authenticate to the identity provider 110. The identity provider 110 verifies that the location in the signed token 118 is the same location as the primary entity 104. A man-in-the-middle attacker 106 is able to access the token 118, but is unable to play it from a different location.

The man-in-the-middle attacker 106 is unable to use the token 118 from their remote location as the location in the token 118 cannot be altered. Should the man-in-the-middle attacker 106 modify the location that is given to the secondary entity 116, the user 102 would be able to see that the location in the authentication context 114 is not as expected, and cancel the request at the secondary entity 116.

Figure 2:
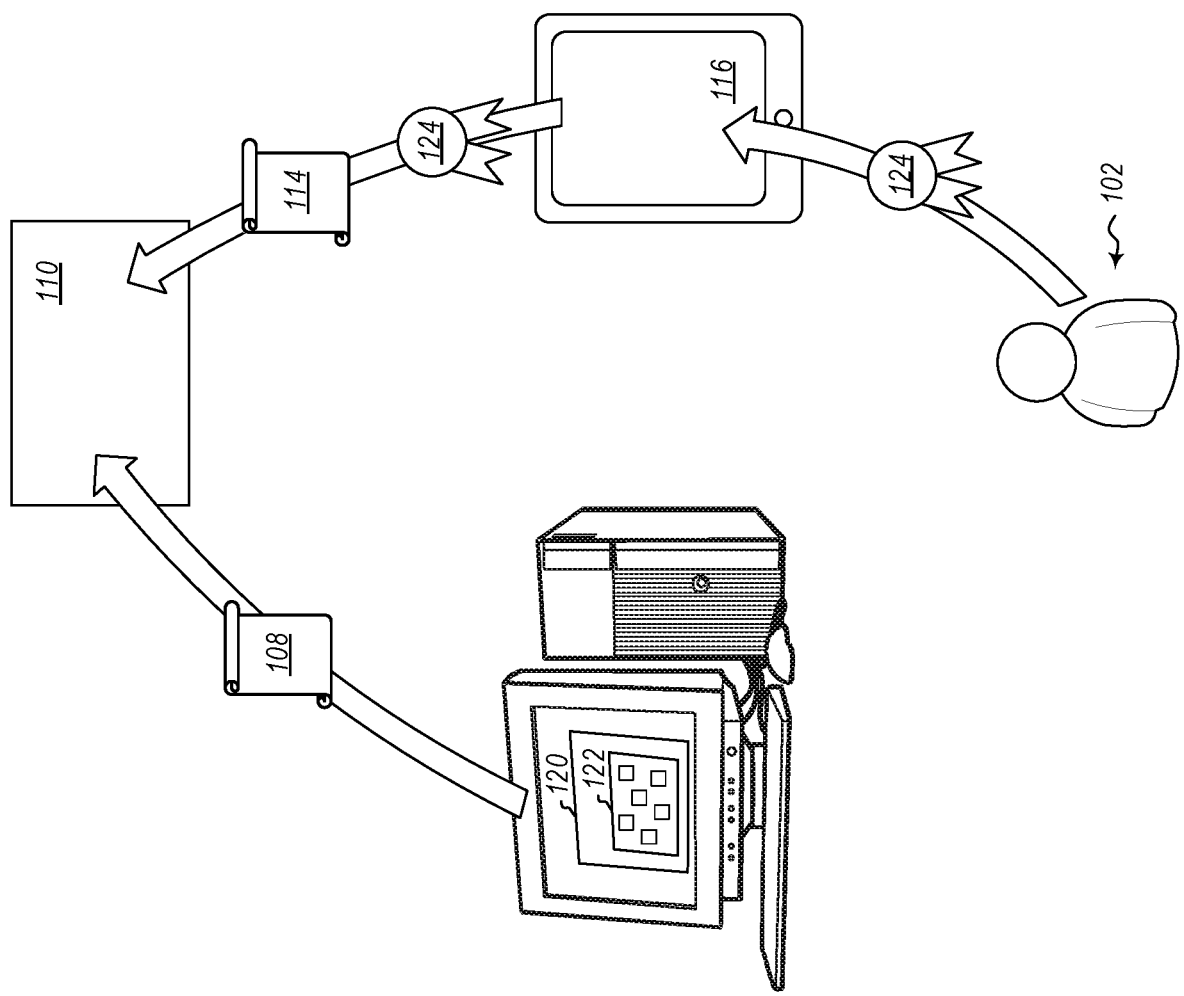
FIG. 2 illustrates another example environment where a primary entity can establish a secure connection with an identity provider using a secondary entity.

Another example is illustrated in FIG. 2. In this example, the user 102 initializes a remote sign-in session on a web browser 120 with the identity provider 110 by sending a remote authentication request 108 to sign in with the user's trusted secondary entity 116. The identity provider 120 causes the web browser 120 to display a QR code 122 with a session identifier and location embedded in the data of the QR code 122 for the secondary entity 116 to approve. On the secondary entity 116, the user 102 scans the QR code 122 and is presented with an option, such as an option on the screen of the secondary entity 116, to approve the remote sign-in based on location information embedded as authentication context in the QR code 122 so as to approve of the remote authentication request 108. The user 102 verifies that the location is appropriate (e.g., that the user is using the primary entity 104 in the location indicated in the authentication context) and enters their local credential 124 and local gesture at the secondary entity 116 to approve the remote authentication request 108 attesting that it came from the user 102. The secondary entity 116 then presents the local credential 124, along with a location 114 to the identity provider 110 to authenticate the remote authentication request 108. The identity provider 110 compares the location of the remote authentication request 108 with the location provided by the secondary entity 116 to ensure it matches with the user-approved location provided by the secondary entity. The identity provider 110 is then able to authenticate a remote session.

The location in this case helps to prevent a man-in-the-middle attack between the browser 120 and the identity provider 110. Should a man-in-the-middle attack occur in this scenario and the user 102 is presented with the attacker's QR code, the user 102 would be able to deny the authentication request as the location would not match what is expected. A more sophisticated attacker may attempt to change the location presented in the QR code—that is, modify the QR code to contain the user's actual location and the attacker's session identifier. The identity provider 110 in this case would prevent the authentication request as the attacker's location would be different than the location 114 approved by the trusted secondary entity 116.

Figure 3:
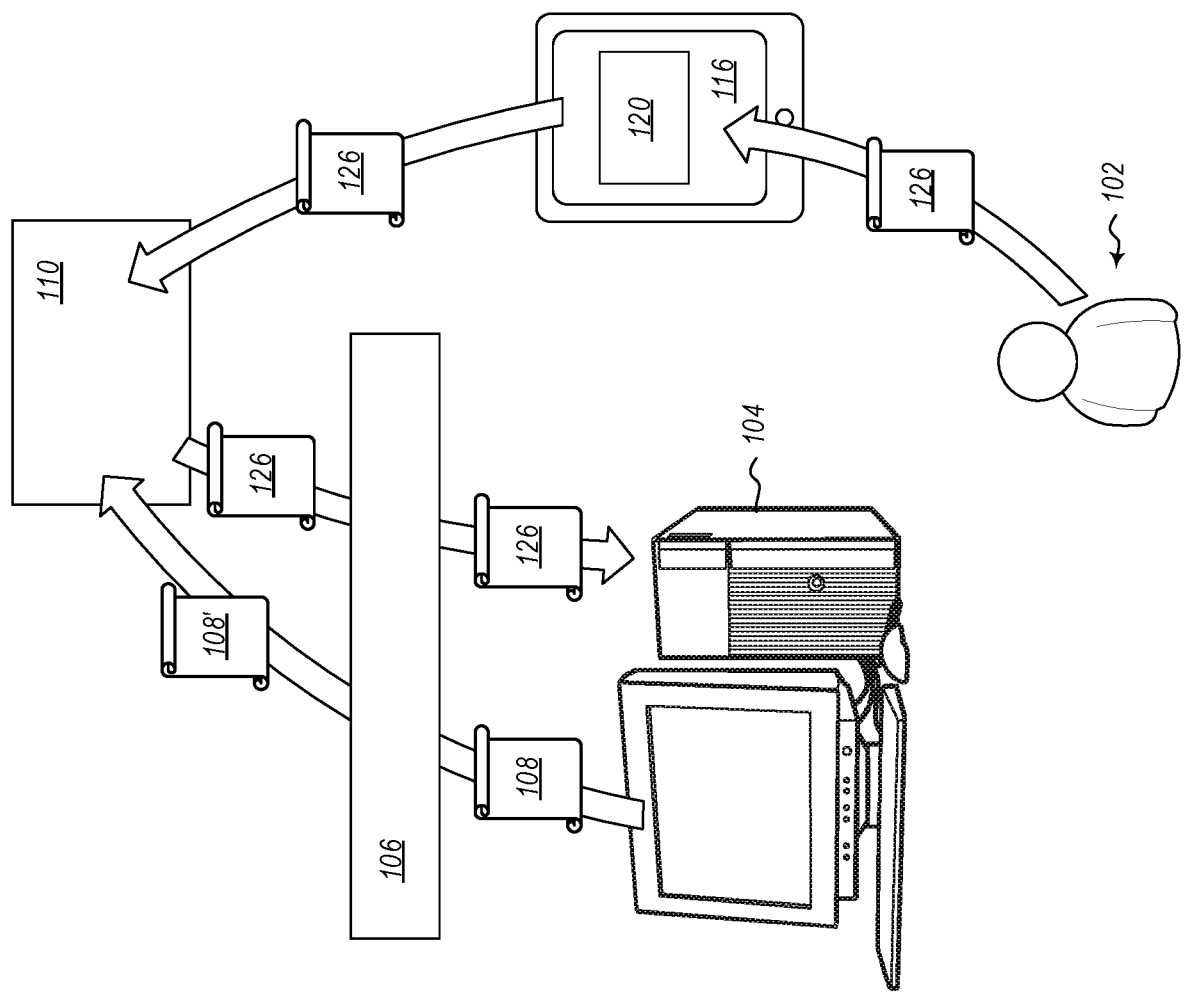
FIG. 3 illustrates another example environment where a primary entity can establish a secure connection with an identity provider using a secondary entity.

Referring now to FIG. 3, another example is illustrated. In this example, a user attempts initialize a remote connect session where a man-in-the-middle attacker intercepts a remote authentication request 108 from the primary entity 104. The man-in-the-middle attacker 106 uses a session identifier from the remote authentication request 108 to create a nefarious remote authentication request 108'. Using the nefarious remote authentication request 108', a remote connect session is created for the attacker 106. The user 102 at the primary entity is presented with the attacker's session identifier 126 for the Remote Connect request. The user 102, unaware, proceeds to a web page 120 to sign-in to the remote authentication session on a trusted secondary entity 116, and enters the attackers session identifier 126 to complete the flow. The flow looks to be secure to the user since the site is using SSL; however, the user enters their username and password (or local credential), and is presented with the location 126 of the session. The user 102 sees that the location differs from what is expected, and denies the session.

A variation to this embodiment could bypass the user approval if the identity provider 110 detects that the location of the primary entity 104 is in close proximity to the location of the secondary entity 116, or the primary entity 104 is in a familiar location. Alternatively or additionally, the identity provider could detect that the primary entity 104 and secondary entity 116 have similar IP addresses indicating that they are connected at a common location.

Figure 4:
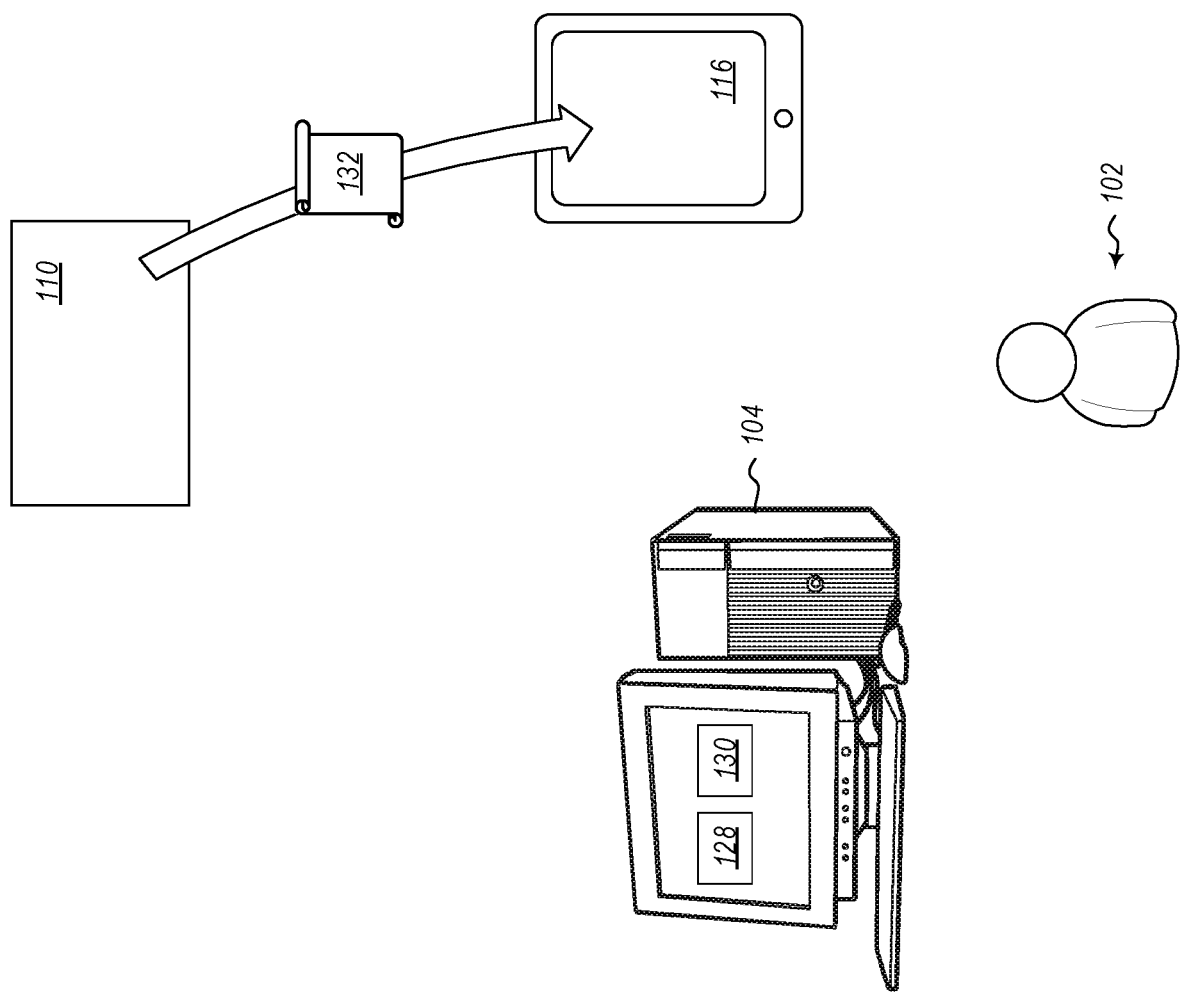
FIG. 4 illustrates another example environment where a primary entity can establish a secure connection with an identity provider using a secondary entity.

Referring now to FIG. 4, another example is illustrated. In this example, a user 102 wants to purchase an app from the identity provider 110 (or an entity associated with the identity provider) through the app store 128 on an entity 104 (e.g., a device) where malware 130 is running. Upon clicking buy in the app store 128, the malware 130 runs and attempts to trick the user 102 into purchasing a malicious app. The user enters a password into the app store 128 as part of the purchase process, and is sent a notification 132 from the identity provider 110 to the secondary entity 116 requesting approval to purchase the app. The secondary entity 116 displays to the user 102 that the app that the user is purchasing a malicious app, and allows the user 102 to then deny the purchase using the secondary entity 116. In this scenario, the malware 130 is unable to modify the notification 132 sent to the trusted secondary entity 116. In this manner, the user 102 can be safely notified, and asked to approve the application that is being purchased.

Thus, embodiments can leverage an existing channel between a secondary entity 116 (such as a device or application) and an identity provider 110 in remote sign-in flows to secure a remote authentication request of a first entity as a means of communicating to a user securely. Embodiments can use the user to help in observing discrepancies in the remote sign-in to secure the remote authentication request by displaying to the user authentication context details observed by the login server (location, device type, entity type, transaction type, etc.) when requesting for sign-in approval.

Embodiments may include identity provider observations relating to the primary entity as part of the signed token from the secondary entity on remote sign-in user approval to allow the identity provider to validate approval of the sign-in coming from the primary entity.

Embodiments may use the channel with the secondary entity to automatically verify observations about the primary entity, and prompt the user on the secondary entity if there is an inconsistency.

Embodiments may notify a user's secondary entity (e.g., using a push notification) with the necessary login observation data to have the user securely approve the request on the secondary entity as a means of secure messaging to the user in the case that the primary entity is compromised.

While FIGS. 1 through 4 have been used to illustrate detailed examples, the following examples illustrated in FIGS. 5 through 8 demonstrate more generic principles that can be implemented in various embodiments of the invention.

Figure 5:
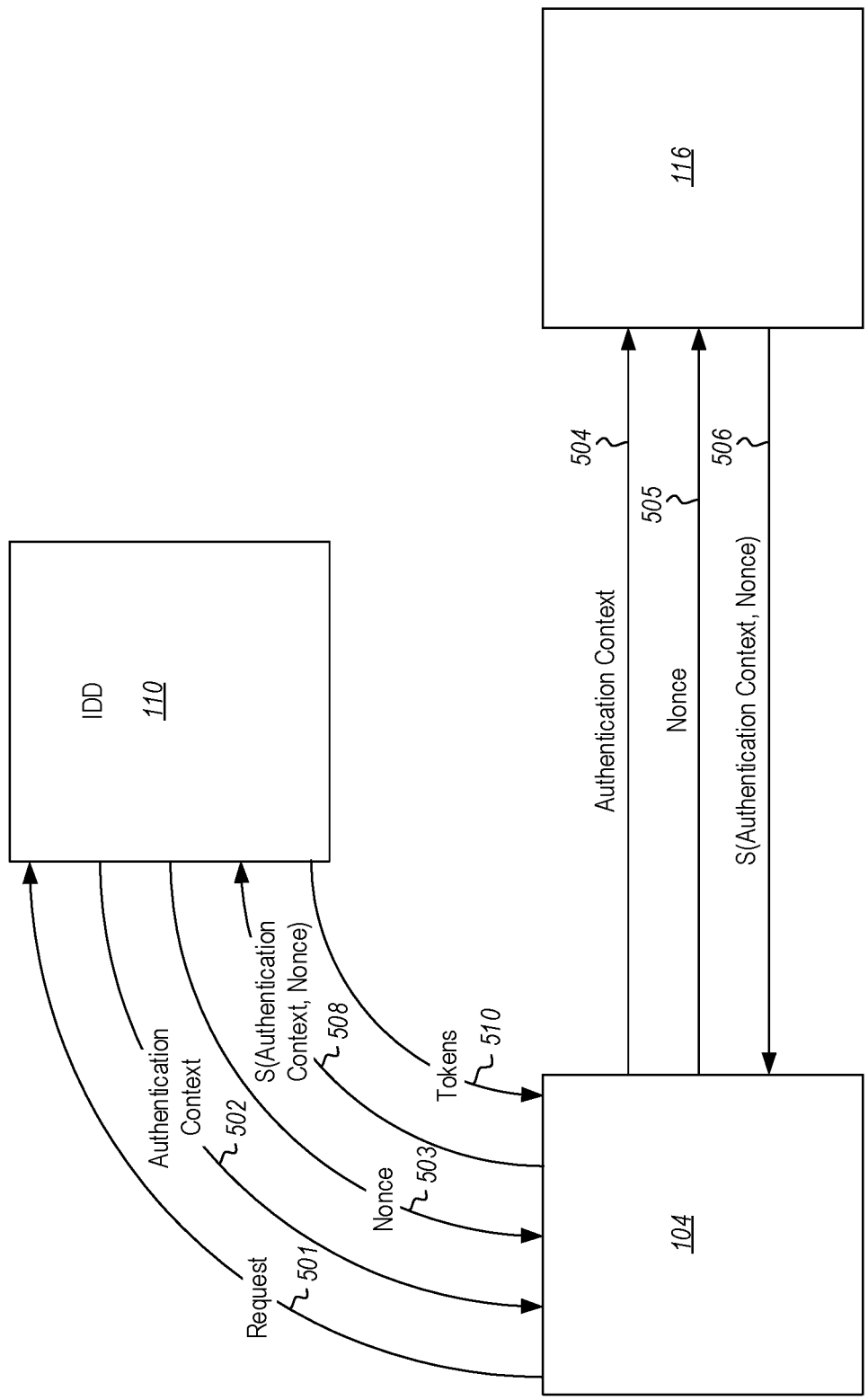
FIG. 5 illustrates another example environment where a primary entity can establish a secure connection with an identity provider using a secondary entity.

Referring now to FIG. 5, a general process flow is illustrated. In the example illustrated in FIG. 5 the first entity 104 sends a request as illustrated at 501 to an identity provider 110. In response to the request, the identity provider 110 sends authentication context as illustrated at 502 and a nonce as illustrated at 503 to the first entity 104. The first entity 104 sends the authentication context as illustrated at 504 and the nonce as illustrated at 505 to the secondary entity 116. This information may be provided to the secondary entity 116 in one or more of a number of different fashions. For example, the information could be provided between the primary entity 104 and the secondary entity 116 using network connections, device tethering, near field communications, wireless connections, a user simply typing information displayed on the primary entity 104 into the secondary entity 116, etc.

The secondary entity 116 may perform various actions for authenticating the authentication context. For example, as discussed previously, the authentication context may be location information. The location information could be displayed at the secondary entity 116 to a user. The user (or the secondary entity 116 itself) could then verify that the location information corresponded to the location of the primary entity 104. In an alternative example, the authentication context could be an IP address. The secondary entity 116 could display to the user the IP address in the authentication context. If the user is able to ascertain the IP address of the primary entity 104, then the user can confirm that the IP address of the primary entity 104 matches the IP address displayed by the secondary entity 116 from the authentication context. This can be accomplished in a number of different fashions. For example, in one embodiment the primary entity 104 may be configured to automatically display the IP address of the primary entity 104 as part of the authentication process with the identity provider 110. However, if malicious software is installed on the primary entity 104, the malicious software may spoof an IP address for a nefarious entity and display the spoofed IP address at the primary entity 104. Thus, in an alternative more secure example, the primary entity 104 may communicate with the secondary entity 116, and as a part of their communication, provide the IP address of the primary entity 104 to the secondary entity 116. The secondary entity 116 could then display the IP address sent as an IP address from the primary entity 104 along with the IP address contained in the authentication context to a user. The user could then compare the information displayed on the secondary entity 116 to determine if the IP address of the primary entity 104 matches the IP address contained in the authentication context.

Once the authentication context has been verified at the secondary entity 116, the secondary entity 116 can sign the authentication context and the nonce and send the signed authentication context and nonce, as illustrated at 506 to the primary entity 104. The primary entity 104 can then send the signed authentication context and nonce to the identity provider 110 as illustrated at 508. The identity provider 110 could verify the signature using standard cryptographic techniques. Additionally or alternatively, the identity provider 110 may verify that authentication context sent from the identity provider 110 to the primary entity 104 at 502 matches the authentication context received back from secondary entity 116 through the primary entity at 508. The identity provider 110 can then provide tokens as illustrated at 510 to the primary entity 104, if all verifications are passed, which the primary entity 104 can then use in an authenticated session with the identity provider 110.

Figure 6:
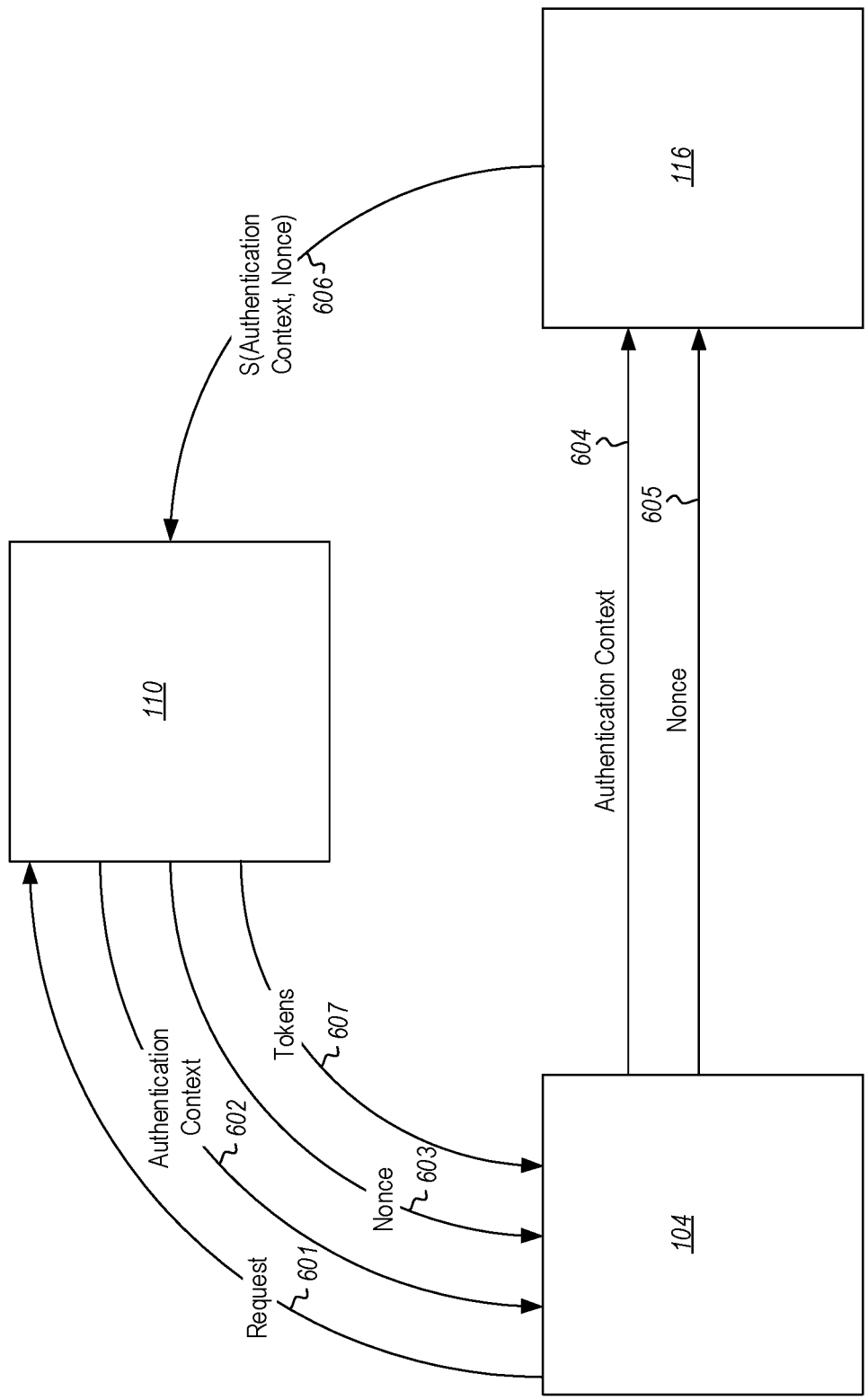
FIG. 6 illustrates another example environment where a primary entity can establish a secure connection with an identity provider using a secondary entity.

Referring now to FIG. 6, an alternative example embodiment is illustrated. FIG. 6 illustrates that the primary entity 104 sends a request as illustrated at 601 to the identity provider 110. The identity provider 110 responds to the request by sending authentication context as illustrated at 602 and a nonce as illustrated at 603 to the primary entity 104. The primary entity 104, provides the authentication context, as illustrated at 604, to the secondary entity 116. The primary entity 104 also provides the nonce, as illustrated at 605, to the secondary entity 116. This information may be provided to the secondary entity 116 in one or more of a number of different fashions. For example, the information could be provided between the primary entity 104 and the secondary entity 116 using network connections, device tethering, near field communications, wireless connections, a user simply typing information displayed on the primary entity 104 into the secondary entity 116, etc.

As with the example illustrated in FIG. 5, the secondary entity can perform various validation actions using the authentication context. For example, as illustrated above, the authentication context may include location information for the primary entity 104. The location information could be displayed at the secondary entity 116, and the user could be allowed to verify the location information on the secondary entity 116. Various other examples of authentication context may be verified as illustrated above, and also in the examples illustrated below.

If the authentication context can be appropriately verified, the secondary entity 116 will sign the authentication context and the nonce and send the signed authentication context and the nonce to the identity provider 110 as illustrated at 606. The identity provider 110 could verify the signature using standard cryptographic techniques. Additionally or alternatively, the identity provider 110 may verify that authentication context sent from the identity provider 110 to the primary entity 104 at 602 matches the authentication context received back from secondary entity 116 at 608. The identity provider 110 can provide the appropriate tokens to the primary entity 104 if all verifications are passed and as illustrated at 607 to allow the primary entity 104 to communicate in a secure session with the identity provider 110.

Figure 7:
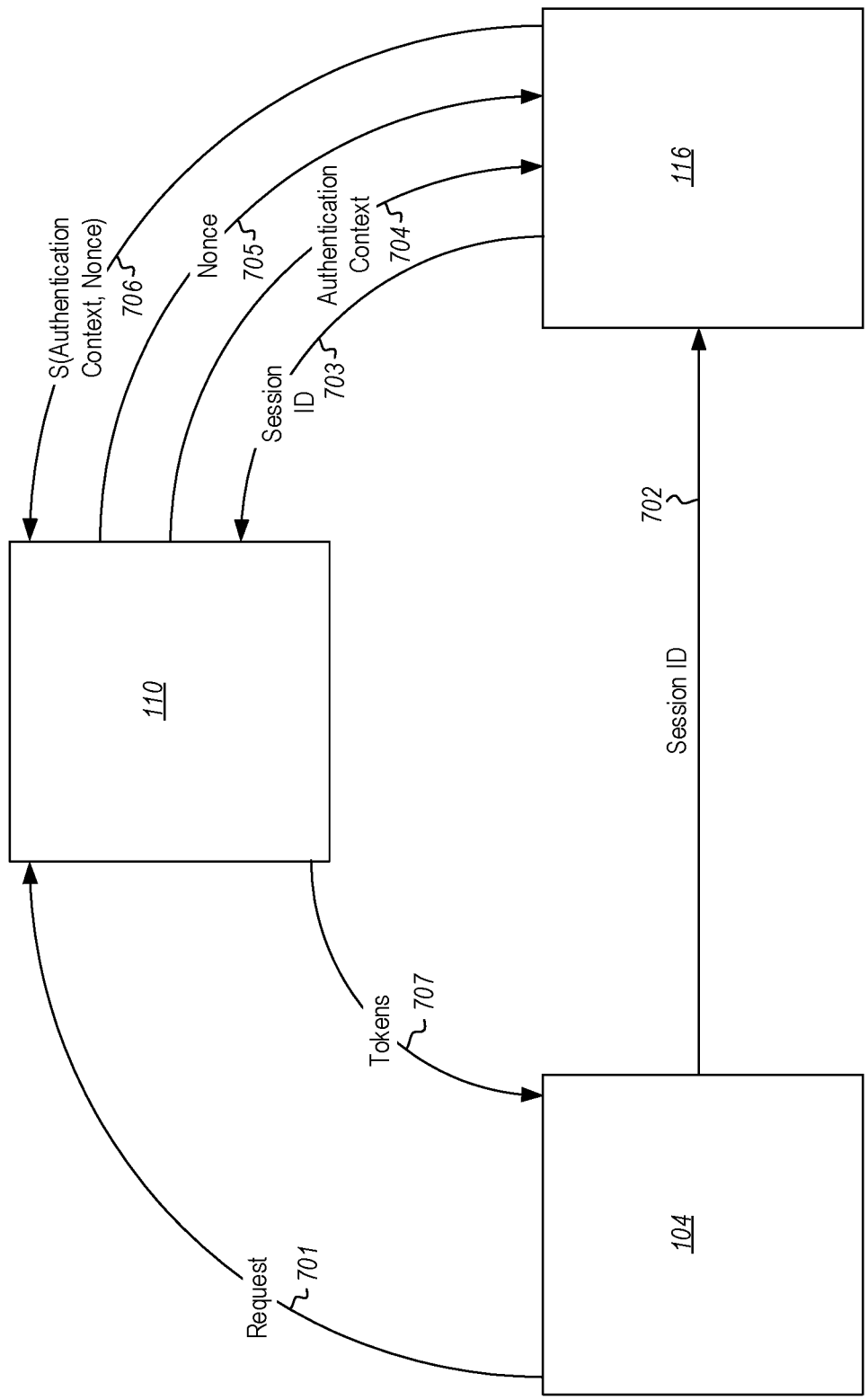
FIG. 7 illustrates another example environment where a primary entity can establish a secure connection with an identity provider using a secondary entity.

Referring now to FIG. 7, yet another alternative example is illustrated. In the example illustrated in FIG. 7, the primary entity 104 sends a request as illustrated at 701 to the identity provider 110. Additionally, as illustrated at 702, the primary entity 104 sends a session identifier corresponding to the request to the secondary entity 116. This information may be provided to the secondary entity 116 in one or more of a number of different fashions. For example, the information could be provided between the primary entity 104 and the secondary entity 116 using network connections, device tethering, near field communications, wireless connections, a user simply typing information displayed on the primary entity 104 into the secondary entity 116, etc.

The secondary entity 116 uses the session identifier in a communication to the identity provider as illustrated at 703. The identity provider 110 receives the session identifier from the secondary entity 116, and in response sends authentication context as illustrated at 704 and a nonce as illustrated at 705. Again, the secondary entity 116 can perform various actions to verify the authentication context. For example, if the authentication context includes location information for the primary entity 104, the location information can be displayed at the secondary entity 116 such that a user can verify that the location information in the authentication context actually corresponds with the location of the primary entity 104. If the authentication context can be properly verified at the secondary entity 116, the authentication context and the nonce are signed and the signed authentication and nonce are sent back to the identity provider 110 from the secondary entity 116 as illustrated at 706. The identity provider 110 could verify the signature using standard cryptographic techniques. Additionally or alternatively, the identity provider 110 may verify that authentication context sent from the identity provider 110 at 704 matches the authentication context received back at the identity provider 110 at 706. In an alternative or additional embodiment, a password, biometric identification, one time code, or other credential may be entered at the secondary entity 116 and returned to the identity provider 110. The authentication can be verified at the identity provider 110. In any of the illustrated examples, the identity provider 110 can then provide the appropriate tokens to the primary entity 104, if all verifications are passed, as illustrated at 707 so that the primary entity 104 can participate in a secure connection with the identity provider 110.

Figure 8:
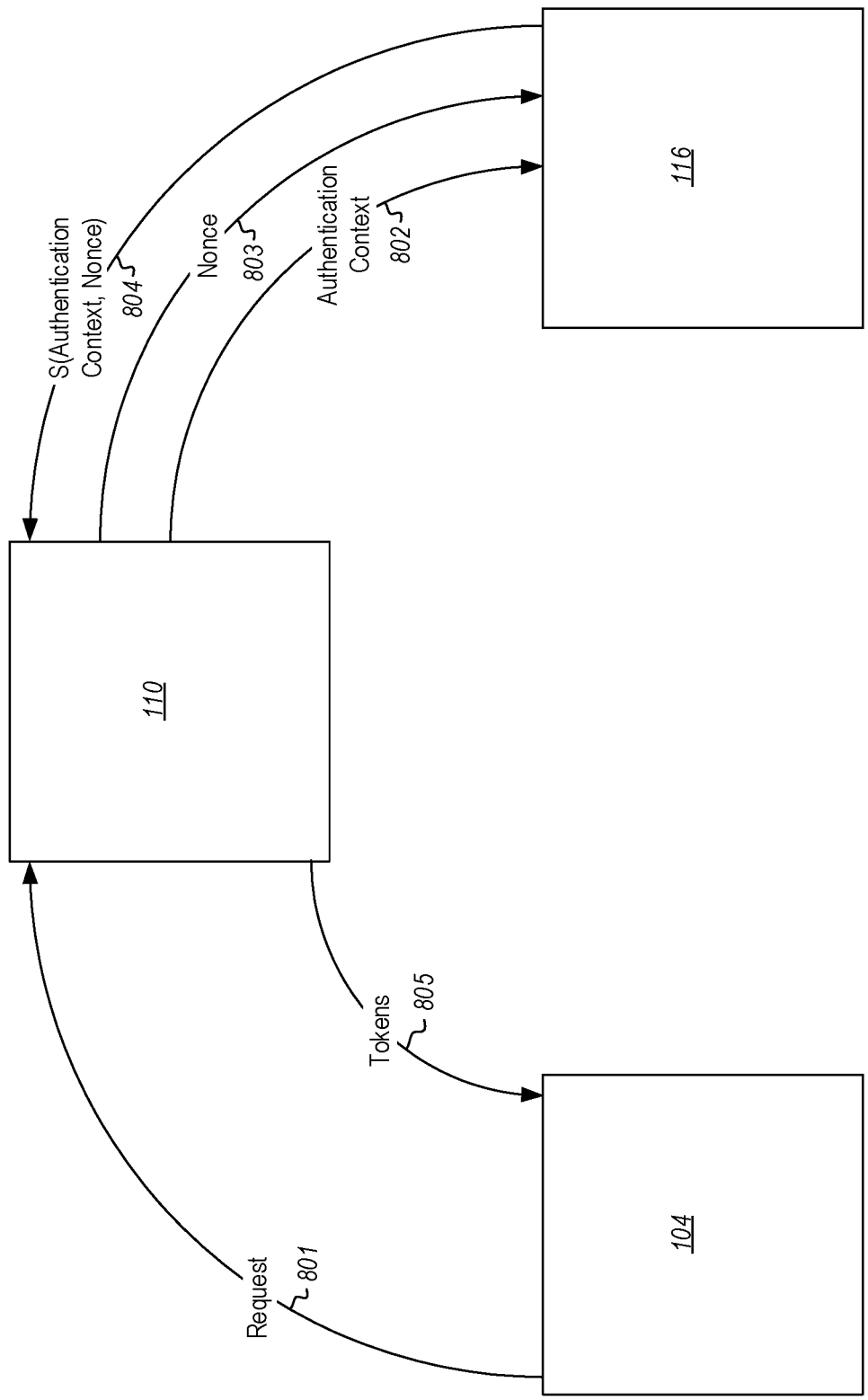
FIG. 8 illustrates another example environment where a primary entity can establish a secure connection with an identity provider using a secondary entity.

Referring now to FIG. 8, yet another example embodiment is illustrated. In this example, the primary entity 104 sends a request to the identity provider 110 as illustrated at 801. In this particular example, the secondary entity 116 may have been pre-registered with the identity provider 110 to receive alerts when various actions are performed between at the primary entity 104 and the identity provider 110. Thus, in this example the authentication context and nonce are automatically sent to the secondary entity 116 as illustrated at 802 and 803 as a result of the secondary entity 116 being pre-registered with the identity provider 110 to receive notifications when the primary entity 104 attempts to request a secure connection with the identity provider 110. Once the secondary entity 116 receives the nonce and authentication context, the secondary entity 116 can perform various verification actions as illustrated above (and in further examples below) to verify the authentication context. Once the authentication context is verified, the authentication context and the nonce can be signed by the secondary entity 116 and the signed authenticated context and nonce can be sent to the identity provider 110 as illustrated at 804. The identity provider 110 could verify the signature using standard cryptographic techniques. Additionally or alternatively, the identity provider 110 may verify that authentication context sent from the identity provider at 802 matches the authentication context received back at the identity provider 110 at 804. In an alternative or additional embodiment, a password, biometric identification, one time code, or other credential may be entered at the secondary entity 116 and returned to the identity provider 110. The authentication can be verified at the identity provider 110. In any of the illustrated examples, the identity provider 110 will then provide the appropriate tokens to the primary entity 104 as illustrated at 805 to allow the primary entity 104 to participate in a secure connection with the identity provider 110. Embodiments can also be used to protect a second authentication factor. For example, in FIG. 8, the initial request illustrated at 801 could include a first credential (which a man-in-the-middle attacker could intercept). However, if establishing a session requires two credentials, the authentication context could be a second credential that could be protected in the way described above.

Various details are now illustrated. For example, various different pieces of information can be used singularly or together as authentication context. In particular, authentication context may generally be information relevant to a secure session between the primary entity 104 and the identity provider 110. For example, authentication context may be location information for the primary entity 104. Such location information may be based on an IP address of the primary entity 104. In an alternative example, the authentication context information may simply be the IP address of the primary entity 104. In yet another alternative example, authentication context may be information about the primary entity 104, such as the device type of the primary entity 104, or some other distinguishing characteristic transmitted during authentication and verifiable by inspection of the primary entity 104. In yet another alternative example, authentication context may be authentication process flow state information. For example, authentication context may include information indicating what actions the user is attempting to perform. For example, authentication context may indicate that the user is attempting to log in to a particular e-commerce web site or other web site. Authentication context may even have finer granularity, such as indicating that the user is about to purchase a particular product or that the user is requesting some other asset. In some embodiments, the tokens provided by the identity provider 110 may only be suitable for the actions indicated in the authentication context. Thus for example, if a user confirms that the authentication context is being used to purchase a particular book from a particular retailer, a nefarious individual would not be able to use the issued tokens to purchase a different book from a different retailer.

Various verification actions can be used by the secondary entity 116 to verify the authentication context. For example, in some embodiments, the secondary entity 116 may display the authentication context to the user and receive user input confirming that the authentication context is accurate. In an alternative example, the secondary entity 116 could receive the authentication context and compare the authentication context with known information. For example, the secondary entity 116 may receive authentication context from the identity provider 110 indicating that the primary entity 104 has a certain IP address. Additionally, in ordinary communication with the primary entity 104, the secondary entity 116 may receive IP information directly from the primary entity 104. The secondary entity 116 can automatically compare the IP address received directly from the primary entity 104 and the IP address contained in the authentication context to determine if they match within some predetermined criteria. If the IP address received from the primary entity 104 matches the IP address in the authentication context, then the secondary entity 116 can allow authentication to proceed, whereas if the IP address received directly from the primary entity 104 does not match the IP address in the authentication context received from the identity provider 110, then authentication can be halted.

In other examples, the identity provider 110 may receive authentication context from either the primary entity 104 or the secondary entity 116, such as an IP address, but can receive a declared IP address outside of the authentication context which can be compared to determine if there is potentially a man in the middle attacker attempting to hijack a secure connection between the primary entity 104 and the identity provider 110.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
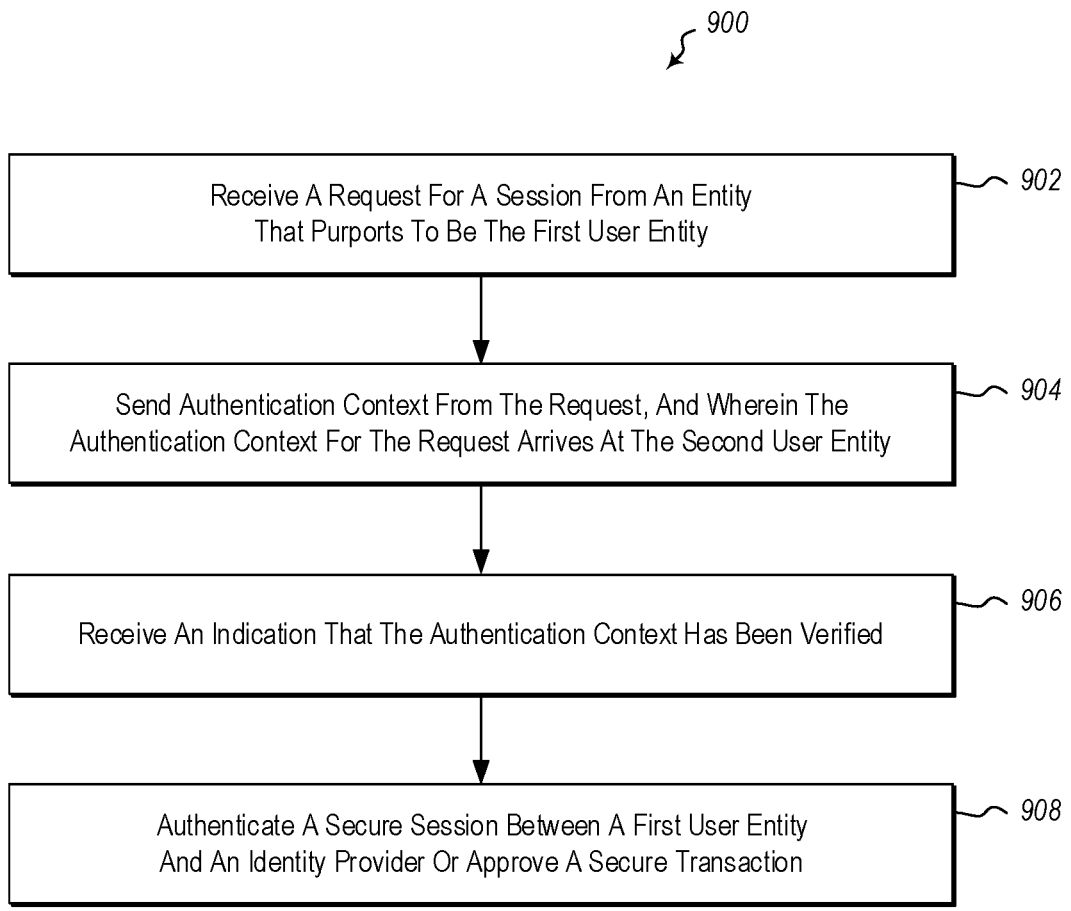
FIG. 9 illustrates a method for authenticating a secure session between a first user entity and an identity provider using a second user entity.

Referring now to FIG. 9, a method 900 is illustrated. The method 900 may be practiced in a computing environment. The method 900 includes acts for authenticating a secure session between a first user entity and an identity provider using a second user entity. The method includes receiving a request for a session from an entity that purports to be the first user entity (act 902). For example, FIG. 1 illustrates a request 108 being received by the identity provider 110 from the primary entity 104. In an alternate example illustrated in FIG. 3, the identity provider 110 receives a request 108' from man-in-the-middle attacker 106 purporting to be the primary entity 104.

The method 900 further includes sending authentication context from the request, and wherein the authentication context for the request arrives at the second user entity (act 904). For example, as illustrated in FIG. 1, the authentication context 114 is sent to the primary entity 104 which then sends the authentication context 114 to the secondary entity 116. In an alternative example illustrated in FIG. 2, the authentication context is sent directly to the secondary entity 116.

The method 900 further includes receiving an indication that the authentication context has been verified (act 906). For example, as illustrated in FIG. 4, the authentication context is signed by the secondary entity 116 and the signed authentication context is passed to the primary entity 104 which then passes the signed authentication context back to the identity provider 110. In an alternative example illustrated in FIG. 6, the authentication context is signed at the secondary entity 116, and the signed authentication context is passed directly from the secondary entity 116 to the identity provider 110.

As a result, the method 900 further includes authenticating a secure session between a first user entity and an identity provider or approving a secure transaction (act 908). For example, each of FIGS. 5, 6,7, and 8 illustrate tokens being passed back from the identity provider 110 to the primary entity 104 which can be used by the primary entity 104 and the identity provider 110 in establishing and maintaining a secure session. Part of establishing a secure connection and or verifying authentication context may include the identity provider verifying that neither the authentication context, nor the indication that the context has been verified, have been tampered with by the first entity or a man-in-the-middle. For example, the identity provider 110 may verify that authentication context sent by the identity provider 110 matches signed authentication context received back at the identity provider.

The method 900 may be practiced where the authentication context comprises a location of the first user entity. For example, as illustrated in FIG. 1, a location of the primary entity 104 may be displayed on a screen of the secondary entity 116, allowing a user 102 to validate the location of the primary entity 104. The location of the primary entity 104 may be determined based on an IP address sent from the primary entity 104 to the identity provider 110, where the identity provider can then use the IP address to ascertain the location of the primary entity 104.

The method 900 may be practiced where the authentication context comprises an IP address for the first user entity. For example, as illustrated in FIG. 1 the secondary entity 116 may display an IP address for the primary entity 104. A user 102 can then verify that the IP address of the primary entity 104 matches the IP address displayed by the secondary entity 116.

The method 900 may be practiced where the authentication context comprises process flow information regarding authentication between the first user entity and the identity provider. For example, as illustrated and FIG. 1, the authentication context 114 may include an indication of the purpose of the authentication of the primary entity 104 to the identity provider 110. For example, the primary entity 104 may be attempting to complete the purchase of a product using the identity provider 110 from an e-commerce site. The secondary entity 116 can display to the user 102 an indication of what the authentication context 104 indicates the session between the primary entity 104 and the identity provider 110 is attempting to accomplish. The user 102 can then validate that they are indeed attempting to perform the actions indicated in the authentication context 114 displayed at the secondary entity 116.

The method 900 may be practiced where the authentication context for the request arrives at the second user entity, to be verified at the second user entity by being sent by the identity provider directly to the second user entity. For example, FIGS. 7 and 8 illustrate examples where the authentication context is sent directly to the secondary entity 116.

Some such embodiments of the method 900 may be practiced where the authentication context is automatically sent to the second user entity as a result of receiving the request for a session, as a result of the second user entity subscribing to receive notifications. For example, the primary entity 104 and the secondary entity 116 may have subscriptions with the identity provider 110. When a request is received from the primary entity 104 at the identity provider 110, the identity provider 110 can automatically send the authentication context of the secondary entity 116.

The method 900 may be practiced where the authentication context for the request arrives at the second user entity, to be verified at the second user entity by being sent by the identity provider directly to the first user entity, which then sends the authentication context to the second user entity. For example, FIGS. 5 and 6 illustrate examples where authentication context is received at the primary entity 104, and then the authentication context is sent from the primary entity 104 to the secondary entity 116. The primary entity 104 may use things such as near field communications, displaying a QR code, wireless connections, network connections, providing a user with data such that the user can input the data into the secondary entity 116, etc. to send the authentication context from the primary entity 104 to the secondary entity 116.

The method 900 may be practiced where receiving an indication that the authentication context has been verified at the second user entity comprises receiving the authentication context signed by the second user entity. For example, FIGS. 5, 6, 7, and 8, illustrate where the authentication context is signed by the secondary entity 116 and the signed authentication context is returned to the identity provider 110.

The method 900 may be practiced where the authentication context has been verified at the second user entity by receiving user input indicating that the authentication context is valid. For example, the authentication context may be displayed at the secondary entity 116 such that a user 102 can validate that the authentication context is valid with respect to the primary entity 104. For example, the user 102 can use the secondary entity 116 to indicate that a location displayed as authentication context is correct for the primary entity 104, that an IP address displayed as authentication context is correct for the primary entity 104, or that a financial transaction indicated in the authentication context comports with a financial transaction that the user 102 is attempting to perform.

The method 900 may be practiced where authenticating a secure session between a first user entity and an identity provider or approving a secure transaction comprises sending one or more tokens from the identity provider to the first user entity. For example, FIGS. 5, 6, 7 and 8 illustrate tokens being delivered from the identity provider 110 to the primary entity 104.

Figure 10:
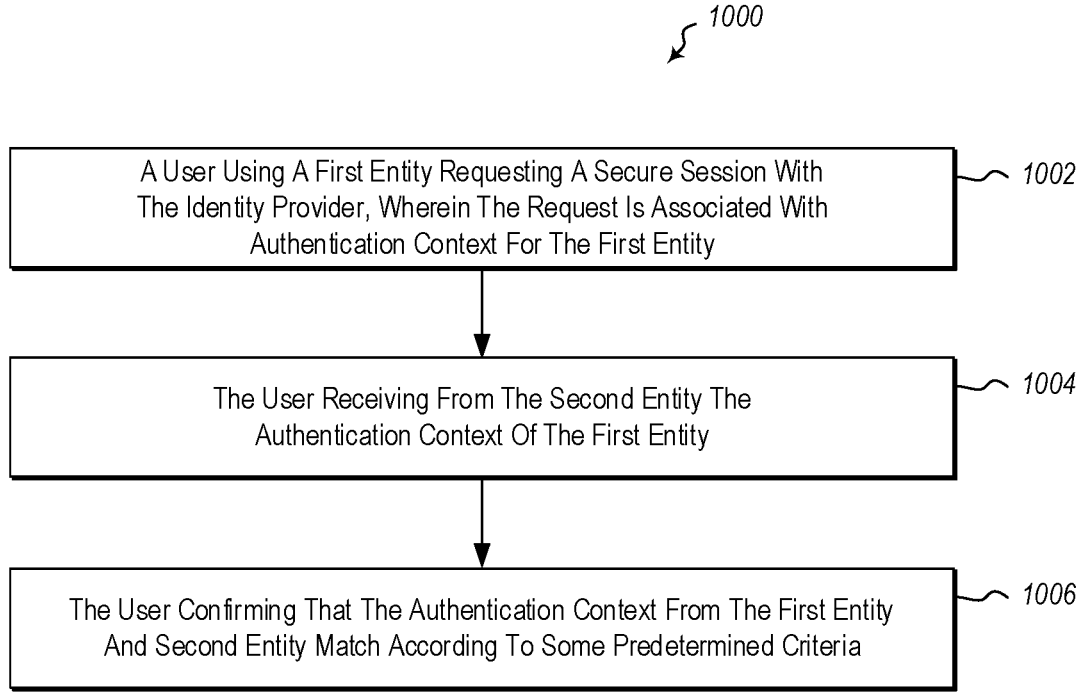
FIG. 10 illustrates another method for authenticating a secure session between a first user entity and an identity provider using a second user entity.

Referring now to FIG. 10, a method to 1000 is illustrated. The method may be practiced in a computing environment. The method includes acts for authenticating a secure session between a first user entity and an identity provider using a second user entity. Note that an entity could be a device, virtual device, application, etc.

The method 1000 includes a user using a first entity requesting a secure session with the identity provider 110, wherein the request is associated with authentication context for the first entity (act 1002). For example, as illustrated in FIG. 1, the user 102 can use the primary entity 104 to send a request 108 to an identity provider 110 to request a secure session between the primary entity 104 and the identity provider 110. The authentication context 114 may be for example, a location, an IP address, a device type corresponding to the primary entity 104, a user agent of the primary entity 104, an action attempting to be performed using the secure session, etc.

The method 1000 further includes the user receiving from the second entity the authentication context of the first entity (act 1004). For example, the user 102 may receive the authentication context 114 by viewing the authentication context on the secondary device 116.

The method 1000 further includes the user confirming that the authentication context from the first entity and second entity match according to some predetermined criteria (act 1006). For example, the user 102 may interact with the secondary entity 116 to verify the displayed authentication context 114.

The method 1000 may be practiced where the second entity receives the authentication context of the first entity from the first entity. For example, the user 102 may view the authentication context 114 on the primary entity 104 as a result of the authentication context being sent from the identity provider 110 directly to the primary entity 104. Alternatively the user 102 may receive the authentication context 114 at the primary entity 104 as a result of the authentication context being sent to the secondary entity 116 and then subsequently being sent to the primary entity 104.

The method 1000 may be practiced where the second entity receives the authentication context from the identity provider 110. For example, the secondary entity 116 may receive the authentication context 114 from the identity provider such as in the example illustrated in FIG. 7.

The method 1000 may be practiced where the authentication context is signed by the second entity. For example the secondary entity 116 may sign the authentication context as illustrated in the various Figures.

The method 1000 may be practiced where the authentication context is received by the second entity using one or more of near field communication, Bluetooth, a scanned QR code, Wi-Fi, peer to peer connections, ZigBee, network connections, etc.

The method 1000 may be practiced where the authentication context is received from the identity provider 110 to the second entity by one or more of an established notification channel, SMS messaging, a secure authenticated connection, etc.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of authenticating a secure session between a first entity of a user and an identity provider by using a second entity of the user, the method comprising:
    at a first entity of a user, sending to an identity provider a request for a secure session;
    receiving, at a second entity of the user, an authentication context based on the request, wherein the authentication context is prepared by the identity provider;
    verifying, at the second entity of the user, that the received authentication context corresponds to the first entity of the user, wherein the verifying includes bypassing user approval for the verifying upon detection that an Internet Protocol (IP) address of the first entity of the user shares a certain similar characteristic with an IP address of the second entity of the user;
    based on the verification, the second entity authorizing the authentication context;
    receiving, at the identity provider, the authorized authentication context; and
    as a result, the identity provider authenticating a secure session or approving a secure transaction between the first entity of the user and the identity provider.

2. The method of claim 1, wherein the second entity receives the authentication context from the first entity.

3. The method of claim 1, wherein the authentication context comprises one of: a location of the first entity of the user or the IP address of the first entity of the user.

4. The method of claim 1, wherein the authentication context is received by the second entity using one or more of: near-field communication, Bluetooth, a scanned QR code, Wi-Fi, Ethernet, ZigBee, or peer to peer.

5. The method of claim 1, wherein the second entity receives the authentication context from the identity provider.

6. The method of claim 1, wherein the authentication context comprises a location of the first entity, and the location is received from the identity provider at the second entity by one or more of an established notification channel, sms, or secure authenticated connection.

7. The method of claim 1, wherein the authentication context comprises at least one of: the IP address of the first entity, a location of the first entity, or process flow information regarding authentication between the first entity and the identity provider.

8. The method of claim 1, wherein the authentication context is included in a push notification that is pushed to the second entity.

9. The method of claim 1, wherein authorizing the authentication context includes signing the authentication context at the second entity.

10. A computer system comprising:
    one or more processors; and
    one or more computer-readable hardware storage devices having stored thereon computer-executable instructions that are executable by the one or more processors to cause the computer system to authenticate a secure session between a first entity of a user and an identity provider by using the computer system, which is a second entity of the user, to at least:
        in response to a request for a secure session being sent to the identity provider from the first entity of the user, receive an authentication context based on the request, wherein the authentication context is prepared by the identity provider;

verify that the received authentication context corresponds to the first entity of the user, wherein verifying that the received authentication context corresponds to the first entity of the user includes bypassing user approval for the verifying upon detection that an Internet Protocol (IP) address of the first entity of the user shares a certain similar characteristic with an IP address of the second entity of the user;

based on the verification, authorize the authentication context; and send the authorized authentication context to the identity provider.

11. The computer system of claim 10, wherein the computer system receives the authentication context from the first entity.

12. The computer system of claim 10, wherein the authentication context comprises one of: a location of the first entity of the user or the IP address of the first entity of the user.

13. The computer system of claim 10, wherein the authentication context is received by the computer system using one or more of: near-field communication, Bluetooth, a scanned QR code, Wi-Fi, Ethernet, ZigBee, or peer to peer.

14. The computer system of claim 10, wherein authorizing the authentication context includes signing the authentication context at the second entity.

15. A method of using a second entity of a user to authenticate a secure session between a first entity of the user and an identity provider, the method comprising:

at a first entity of a user, sending to an identity provider a request for a secure session;

receiving, at a second entity of the user, an authentication context based on the request, wherein the authentication context is prepared by the identity provider;

verifying, at the second entity of the user, that the received authentication context corresponds to the first entity of the user, wherein the verifying includes bypassing user approval for the verifying upon detection that an Internet Protocol (IP) address of the first entity of the user shares a certain similar characteristic with an IP address of the second entity of the user;

based on the verification, the second entity authorizing the authentication context in response to the authentication context being signed;

receiving, at the identity provider, the authorized authentication context; and as a result, the identity provider authenticating a secure session or approving a secure transaction between the first entity of the user and the identity provider.

16. The method of claim 15, wherein the authentication context comprises one of: a location of the first entity of the user or the IP address of the first entity of the user.

17. The method of claim 15, wherein the authentication context is received by the second entity using one or more of: near-field communication, Bluetooth, a scanned QR code, Wi-Fi, Ethernet, ZigBee, or peer to peer.

18. The method of claim 15, wherein the authentication context comprises at least one of: the IP address of the first entity, a location of the first entity, or process flow information regarding authentication between the first entity and the identity provider.

19. The method of claim 15, wherein the authentication context is included in a push notification that is pushed to the second entity.

20. The method of claim 15, wherein the first entity is a phone, and wherein the second entity is a web browser executing on a device different than the phone.

* * * * *